(12) United States Patent
Fripp et al.

(10) Patent No.: US 9,790,785 B2
(45) Date of Patent: Oct. 17, 2017

(54) SYSTEMS AND METHODS FOR DOWNHOLE TELECOMMUNICATION

(71) Applicant: Halliburton Energy Services, Inc., Houston, TX (US)

(72) Inventors: Michael Linley Fripp, Carrollton, TX (US); Donald Kyle, Plano, TX (US); Gregory Thomas Werkheiser, Dallas, TX (US); Scott Miller, Highland Village, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 75 days.

(21) Appl. No.: 14/118,451

(22) PCT Filed: Dec. 28, 2012

(86) PCT No.: PCT/US2012/071943
§ 371 (c)(1),
(2) Date: Nov. 18, 2013

(87) PCT Pub. No.: WO2014/105033
PCT Pub. Date: Jul. 3, 2014

(65) Prior Publication Data
US 2015/0152727 A1 Jun. 4, 2015

(51) Int. Cl.
*E21B 47/12* (2012.01)
*E21B 47/14* (2006.01)
*H04W 84/18* (2009.01)
*H04W 88/04* (2009.01)

(52) U.S. Cl.
CPC ............. *E21B 47/14* (2013.01); *E21B 47/12* (2013.01); *E21B 47/122* (2013.01); *H04W 84/18* (2013.01); *H04W 88/04* (2013.01)

(58) Field of Classification Search
CPC ............................ E21B 47/12; E21B 47/122
USPC ............................ 340/853.1, 853.7; 367/81
See application file for complete search history.

(56) References Cited

U.S. PATENT DOCUMENTS

| | | | |
|---|---|---|---|
| 7,249,636 B2 | 7/2007 | Ohmer | |
| 7,453,768 B2 * | 11/2008 | Hall et al. | 367/82 |
| 2007/0024464 A1 | 2/2007 | Lemenager et al. | |
| 2007/0107938 A1 | 5/2007 | Cornish et al. | |

(Continued)

FOREIGN PATENT DOCUMENTS

| | | |
|---|---|---|
| WO | 2004095190 A2 | 11/2004 |
| WO | 2011082122 A1 | 7/2011 |
| WO | 2014105033 A1 | 7/2014 |

OTHER PUBLICATIONS

International Search Report and Written Opinion for PCT/US2012/071943 dated Sep. 6, 2013.

(Continued)

*Primary Examiner* — Benyam Haile
(74) *Attorney, Agent, or Firm* — McDermott Will & Emery LLP

(57) ABSTRACT

An echo communication system has a plurality of triggers disposed within a first distance of each other and a hub separated from the plurality of triggers by at least a second distance that is greater than the first distance. The hub is configured to wirelessly transmit a signal intended for one of the triggers and each of the triggers will re-broadcast the same signal if they are not the intended recipient.

20 Claims, 9 Drawing Sheets

(56) References Cited

U.S. PATENT DOCUMENTS

| | | | |
|---|---|---|---|
| 2008/0106972 A1* | 5/2008 | Liang | E21B 47/124 367/25 |
| 2009/0033516 A1 | 2/2009 | Alteirac et al. | |
| 2011/0158050 A1* | 6/2011 | Merino | E21B 47/12 367/81 |
| 2011/0186290 A1 | 8/2011 | Roddy et al. | |
| 2012/0249338 A1 | 10/2012 | Merino | |
| 2013/0301388 A1* | 11/2013 | Hartmann | E21B 47/14 367/81 |
| 2014/0160890 A1* | 6/2014 | Fang | G01V 1/50 367/35 |

OTHER PUBLICATIONS

Supplementary EP Search Report received in corresponding EP Application No. 12891181, dated Jul. 19, 2016.

* cited by examiner

Time = T3

Time = T3+ΔT

SYSTEMS AND METHODS FOR DOWNHOLE TELECOMMUNICATION

This application is a National Stage entry of and claims priority to International Application No. PCT/US2012/071943, filed on Dec. 28, 2012.

BACKGROUND

The present disclosure is related to downhole telecommunication systems and methods and, more particularly, to coordinating downhole wireless receivers in order to achieve more reliable signals.

While drilling a gas or oil well, it is often necessary to send and to receive signals along the borehole to communicate with downhole instruments and tools. While it is possible to communicate over hard lines, such as electrical or optical cables, that run alongside a tubular disposed with the borehole, these hard lines run the risk of being damaged or otherwise rendered inoperable during well operations. As a result, it is often advantageous to employ wireless means of telecommunication between various devices within the borehole. Some conventional downhole telecommunication systems employ single repeaters arranged at intervals along tubing or piping extended within the borehole and are configured to convey wireless signals up and down the borehole.

Wireless communication between downhole devices along a tubular disposed within a wellbore may be hampered by the variable transmission paths through the annulus defined between the tubular and the walls of the borehole. In addition, intervening equipment between devices within the annulus may prevent direct line-of-sight communication paths between axially adjacent devices. In certain circumstances, telecommunication from a first device to a second device may be blocked or otherwise limited due to the spatially dependent aspects of the signal being transmitted by the first device.

SUMMARY OF THE INVENTION

The present disclosure is related to downhole telecommunication systems and methods and, more particularly, to coordinating downhole wireless receivers in order to achieve more reliable signals.

In some embodiments, a system is disclosed that includes a plurality of triggers disposed within a first distance of each other and a hub separated from the plurality of triggers by at least a second distance that is greater than the first distance. The hub is configured to wirelessly transmit a signal configured for receipt by at least one of the plurality of triggers. Each of the plurality of triggers is configured to receive and re-broadcast the signal.

In some embodiments, a method is disclosed that includes the step of transmitting a wireless signal directed to at least one of a plurality of triggers with a hub disposed within a borehole. The plurality of triggers are arranged within a first distance of each other and the hub is separated from the plurality of triggers by at least a second distance that is greater than the first distance. The method also includes the step of re broadcasting the wireless signal with triggers that are not the at least one of the plurality of triggers to which the wireless signal is directed.

In some embodiments, a system is disclosed that includes a plurality of triggers disposed within a first distance of each other and a hub separated from the plurality of triggers by at least a second distance that is greater than the first distance. The hub is configured to wirelessly receive a signal transmitted by any of the plurality of triggers. Each of the plurality of triggers is configured to receive and re-broadcast a signal transmitted by another of the plurality of triggers.

In some embodiments, a repeater is disclosed that includes a plurality of triggers arranged within a borehole at a first axial location. Each of the triggers is configured to receive and re-transmit a wireless signal to a second axial location.

In some embodiments, a method is disclosed that includes the steps of receiving a wireless signal with at least one trigger of a plurality of triggers arranged within a borehole at a first axial location, and re-transmitting the wireless signal to a second axial location with the at least one trigger.

The features and advantages of the systems and methods of the present disclosure will be readily apparent to those skilled in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
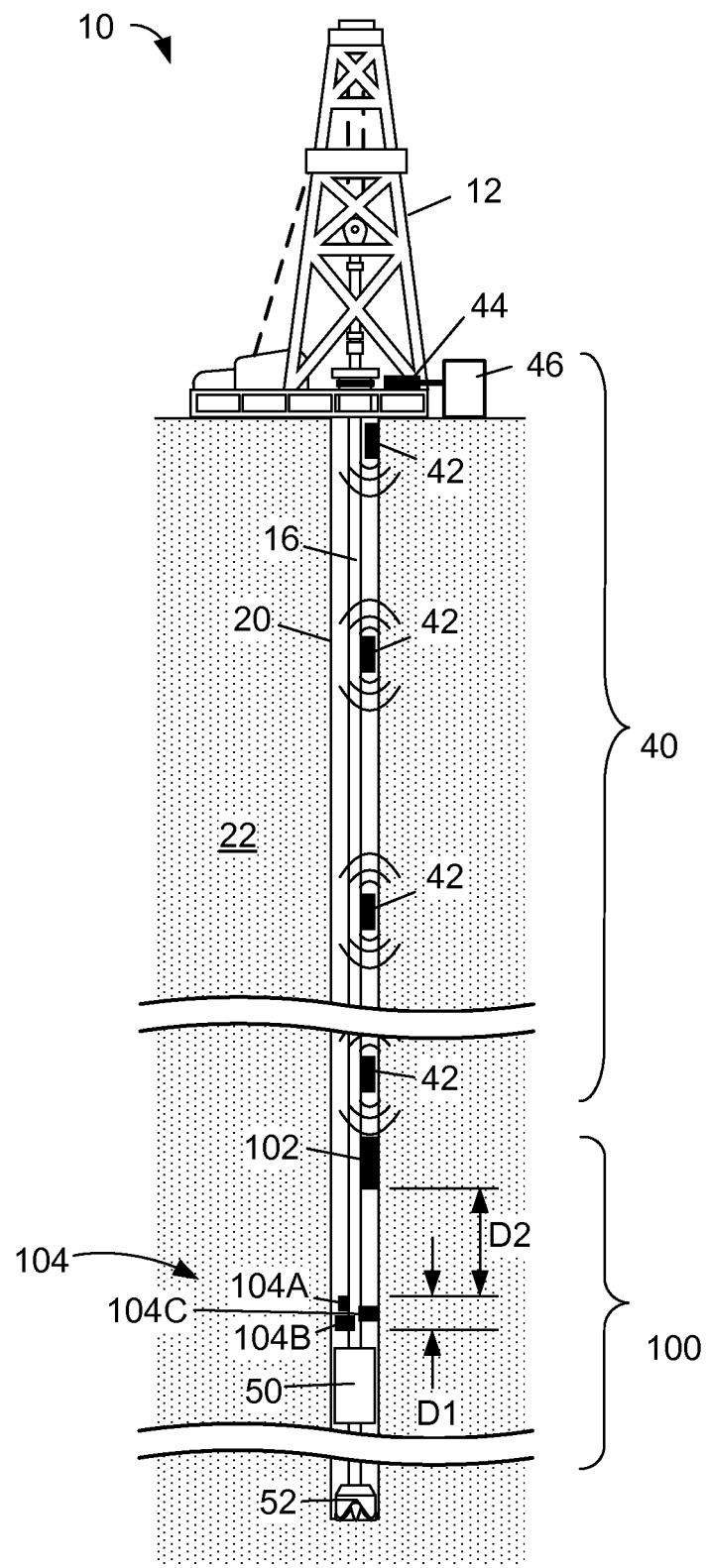
FIG. 1 illustrates a land-based oil and gas rig that includes an exemplary echo telemetry system, according to certain embodiments of the present disclosure.

The present disclosure is related to downhole telecommunication systems and methods and, more particularly, to coordinating downhole wireless receivers in order to achieve more reliable signals.

Wireless communication between any two single downhole devices (e.g., receivers, transceivers, etc.) that are separated along a tubular disposed within a wellbore may be degraded or, in certain circumstances, entirely lost for a variety of reasons. For instance, downhole equipment may be disposed between the two devices and obstruct or otherwise block a direct line-of-sight communication path between the two devices. Moreover, the transmission path for a signal transmitted within the annulus defined between the tubular and the walls of the wellbore may be spatially non-uniform due changes in borehole direction. As a result, the intended receipt device may be disadvantageously located in a "dead zone" where the strength of the transmitted signal drops to a level that is too low to correctly receive the signal. In addition, variability in the performance of the receiving portion of the device may cause this particular device to be less sensitive.

The systems and methods disclosed herein provide redundancy in receiving and sending transmitted signals such that any one receiver is capable of echoing a received signal to adjacent receivers, thereby ensuring that each receiver has received the transmitted signal. In one embodiment, for example, one particular trigger (i.e., receiver) may not be able to directly receive a signal transmitted from an uphole device, such as a signal hub, but one or more adjacent triggers may be able to receive the signal. According to the present disclosure, the first trigger will nonetheless be able to receive the signal transmitted by this uphole device through an echo or re-broadcast of the transmitted by the adjacent triggers. As can be appreciated by those skilled in the art, this will enhance the reliability of downhole wireless communication. Moreover, such increased reliability can be obtained without having to add more components to the tool string. Instead, the disclosed methods and systems allow an operator to use the parts that are already part of the tool string to rebroadcast the command signals.

As used herein, the term "trigger" refers to a device that is configured to receive and/or transmit wireless signals and, in response to the receipt of certain wireless command signals, cause an action to occur. In some applications, the trigger may be coupled to downhole sampling equipment and configured to activate the sampling process upon receiving and processing the appropriate command signal. In other applications, the trigger may be coupled to downhole measurement equipment, such as one or more measure while drilling (MWD) sensors, logging while drilling (LWD) sensors, or other downhole sensors, and may be configured to take and record various downhole measurements upon receiving and processing the appropriate command signal. In yet other applications, the trigger may be coupled to one or more downhole tools or devices, such as an inflow control device or a sliding sleeve or door, and the trigger may be configured to actuate such downhole tools or devices upon receiving and processing the appropriate command signal. In certain embodiments, the action may be the acquisition of information and transmission of a signal comprising the information by the trigger, for example transmission of readings taken by a coupled MWD or a configuration status of a coupled inflow control device.

FIG. 1 illustrates a land-based oil and gas rig 10 that may include an exemplary echo telemetry system 100, according to one or more embodiments. It should be noted that, even though FIG. 1 depicts a land-based oil and gas rig 10, it will be appreciated by those skilled in the art that the components of the rig 10, and various embodiments of the components disclosed herein, are equally well suited for use in other types of rigs, such as offshore platforms, subsea equipment, or rigs used in any other geographical location. As illustrated, the rig 10 may include a drilling platform 12 with a drill string 16 extending therefrom and configured to drive a drill bit 52 arranged at the distal end of the drill string 16. The drill bit 52 may be used to create a borehole 20 that passes through various subterranean formations 22.

As used herein, the term "drill string" may refer to one or more types of connected lengths of tubulars as known in the art, and may include, but is not limited to, drill pipe, landing string, production tubing, jointed tubing, combinations thereof, or the like. In other embodiments, the drill string 16 may be replaced with any other downhole conveyance means known by those skilled in the art such as, but not limited to, coiled tubing, wireline, slickline, and the like, without departing from the scope of the disclosure.

Although FIG. 1 depicts a vertical section of the borehole 20, the present disclosure is equally applicable for use in boreholes or wellbores having other directional configurations including horizontal wellbores, deviated wellbores, slanted wellbores, combinations thereof, and the like. Furthermore, the borehole 20 may have a branched structure, e.g., multiple lower boreholes, also referred to as "laterals," that split off from the upper borehole at a common point or at separate points. The disclosed systems may be deployed within a single lateral or in multiple laterals without departing from the scope of this disclosure. Moreover, use of directional terms such as above, below, upper, lower, upward, downward, uphole, downhole, and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe or bottom of the well; these directions are merely illustrative in nature and do not limit the scope of the disclosure.

The echo telemetry system 100 may include a hub 102 and one or more triggers 104 that may be used to initiate one or more actions of a downhole tool 50. In this example, the plurality of triggers 104 includes three triggers 104A, 104B, and 104C, that may be coupled to the drill string 16 and arranged at a generally common axial location within the borehole 20. As depicted, the echo telemetry system 100 and its corresponding triggers 104A-C may be arranged in an area proximate or otherwise axially adjacent to the downhole tool 50. In other embodiments, the triggers 104A-C may be located at other axial locations within the borehole 20, such as proximate to the drill bit 52.

The downhole tool 50 may include any downhole tool, instrument, or device known to those skilled in the art. For example, the downhole tool 50 may be, but is not limited to, a fluid sampling system or device, an MWD sensor, an LWD sensor, a pressure-while-drilling (PWD) sensor, a temperature sensor, a pressure sensor, an acoustic sensor, a magnetic sensor (e.g., magnetometer or other downhole compass), a flow rate sensor, an optical sensor, a vibration sensor, a strain sensor, a resistivity sensor, a density sensor, a magnetic resonance imaging tool, a nuclear magnetic resonance tool, an electromagnetic telemetry tool, positive or negative fluid pulsers, a resistivity sensor, a packer or other wellbore isolation device, a motor or an actuator configured to manipulate the position of an inflow control device or sliding sleeve, combinations thereof, and the like.

In certain embodiments, the triggers 104A-C may be generally located within the borehole 20 within an axial zone encompassing a first distance D1, and the hub 102 may separated from the nearest of the plurality of triggers 104 by a second distance D2. In one or more embodiments, the second distance D2 is greater than the first distance D1, and the largest direct distance separating each trigger 104A-C from any other trigger within the plurality of triggers 140 may be less than or equal to D1.

The hub 102 may be a transceiver configured to receive and transmit data along the length of the drill string 16 and communicate with the triggers 104A-C. In some embodiments, the hub 102 may be a uni-directional repeater, i.e., configured to only send downlink signals to the triggers 104A-C. In other embodiments, however, the hub 102 may be bi-directional, i.e., configured to send and receive uplink and downlink telemetry signals. In other embodiments, however, the hub 102 may be connected to an electrical cable or fiber optic cable to facilitate communication. As used herein, the terms "uplink" and "uphole" refer to telemetry signals generally directed towards the hub and away from the triggers. Conversely, the terms "downlink" and "downhole" refer to signals generally directed towards the triggers 104A-C and away from the hub 102. Accordingly, the terms "uplink" and "downlink" are not intended to convey actual direction within the wellbore. In at least one embodiment, the hub 102 may be a repeater such as is described in co-owned U.S. Pat. No. 8,040,249 entitled "Acoustic Telemetry Transceiver," the contents of which are hereby incorporated by reference.

In certain embodiments, a fluid may be provided within the borehole 20 and facilitate the wireless transmission of signals between the hub 102 and the triggers 104A-C via acoustic or fluid pulse telemetry. The fluid may include, for example, a drilling fluid or "mud," a production fluid, a stimulation fluid, or any fluid or fluid composition that may be present during the development or management of an oil and gas well, as known to those of skill in the art. In certain embodiments, the signals may be communicated through the borehole 20 by radio frequency transmission. Those skilled in the art will readily appreciate that various other forms of wireless telecommunication not necessarily mentioned herein may be used to facilitate the wireless transmission of signals between the hub 102 and the triggers 104A-C, without departing from the scope of this disclosure.

Figure 2A:
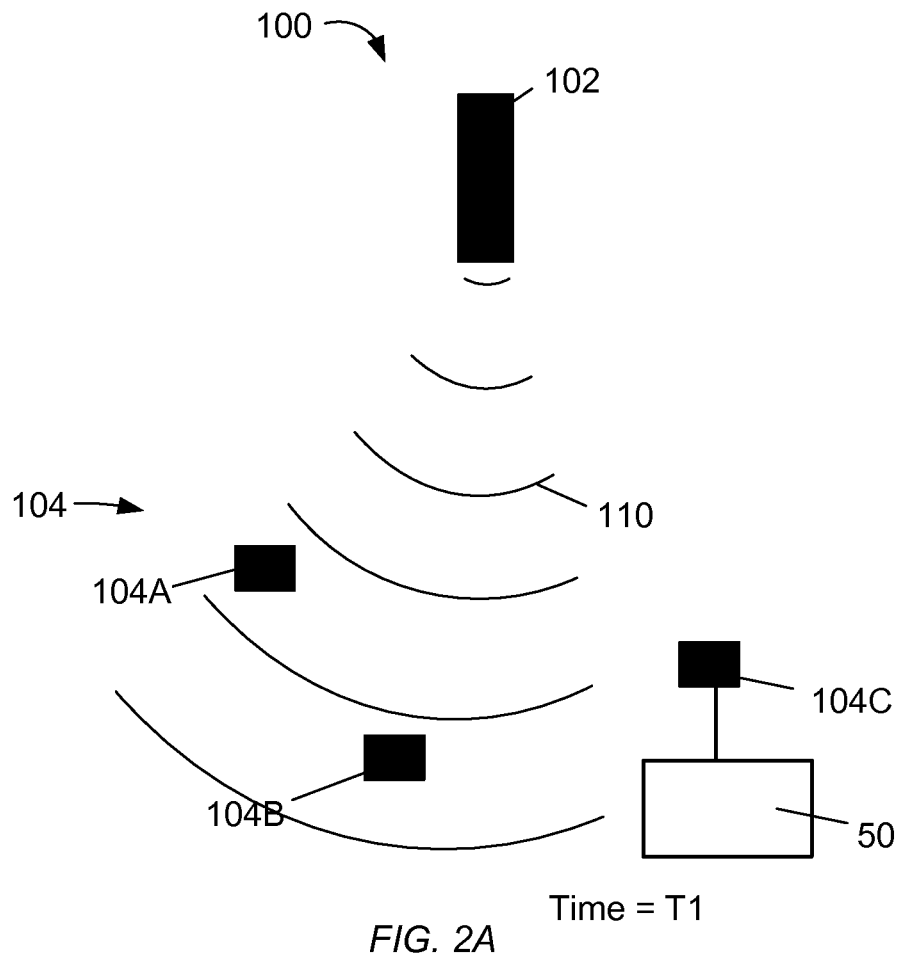
FIGS. 2A-2B depict an enlarged view of the echo telemetry system of FIG. 1 during downward signal transmission, according to certain embodiments of the present disclosure.
Figure 2B:
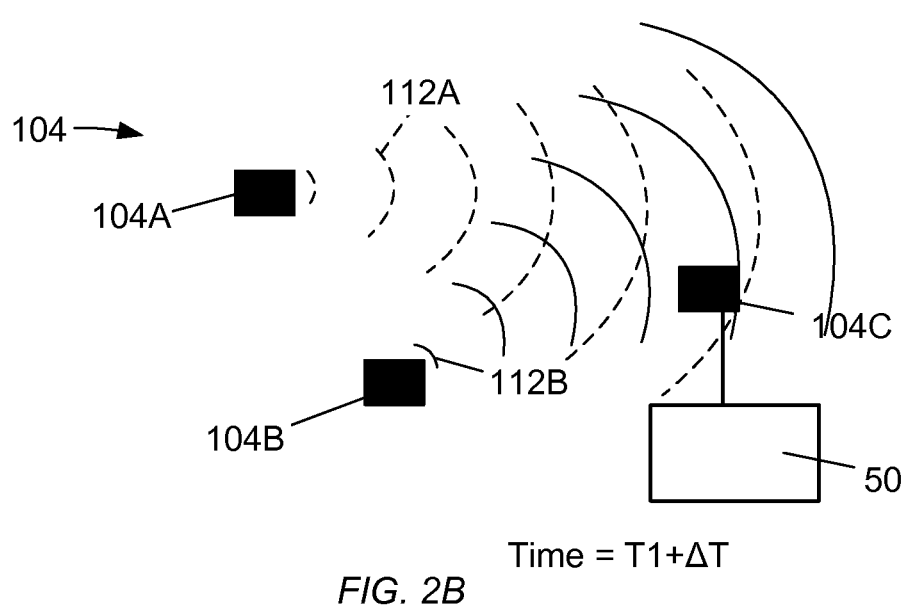

Referring now to FIGS. 2A-2B, with continued reference to FIG. 1, depicted is an enlarged view of the echo telemetry system 100 as used for downward signal transmission, according to certain embodiments of the disclosure. The borehole 20 and drill string 16 of FIG. 1 have been omitted from FIGS. 2A-2B for clarity, but the hub 102 and triggers 104A-C may be generally arranged as shown in FIG. 1. In FIG. 2A, the hub 102 is illustrated as broadcasting a downlink signal that is, for the example of FIGS. 2A-2B, a pulse train 110 transmitted at a time T1 toward the triggers 104A-C. The pulse train 110 may be configured to be received by a recipient trigger, e.g., the third trigger 104C, in order to activate the downhole tool 50 communicably coupled thereto. In at least one embodiment, the downlink signal may be transmitted wirelessly via radio frequency. In other embodiments, the downlink signal may be transmitted using any other wireless telemetry or telecommunication method such as, but not limited to, acoustic, fluid pulse, or electromagnetic telemetry, without departing from the scope of the disclosure.

In the illustrated embodiment, the pulse train 110 is able to reach or otherwise directly communicate with the first and second triggers 104A,B but is unable to directly communicate with the third trigger 104C. As briefly discussed above, this may be due to several reasons including, for example, the transmission path within the borehole having a "dead zone" at the location of the third trigger 104C. In other applications, the pulse train 110 may not be able to reach the third trigger 104C because of an increased amount of noise in the borehole that obscures the signal 110 or because the pulse train 110 has insufficient strength at the location of third trigger 104C so as to be received intact. Since the third trigger 104C is not able to receive the pulse train 110, the downhole tool 50 is not activated at the time T1 of transmission of the pulse train 110 by the hub 102.

In certain embodiments, the pulse train 110, or other downlink signal, may include an error-detection element, for example, a check-sum value, that enables a receiving trigger to determine whether the pulse train 110 has been received intact. In certain embodiments, the triggers 104A-C may include stored information about the structure of incoming signals and therefore be able to determine whether the pulse train 110 is received intact. In certain embodiments, other methods of determining whether the pulse train 110 has been received intact, as known of those of skill in the art, may be employed in the system 100 to enable the triggers 104A-C to determine whether the pulse train 110 is properly received.

With reference to FIG. 2B, the first and second triggers 104A,B may be configured to echo or re-broadcast the pulse train 110 (shown as signals 112A and 112B, respectively) so that the third trigger is able to receive the signal 110. In some embodiments, the re-broadcasting of the pulse train 110 by the first and second triggers 104A,B may occur at a time that is after time T1 by a time delay $\Delta T$. Due to the proximity of the first and second triggers 104A,B, the third trigger 104C may be able to readily receive and process the re-broadcasted pulse train 110 (shown as signals 112A and 112B that, in certain embodiments, are also pulse trains). In some embodiments, the action performed by the third trigger 104C may include sending a signal to the downhole tool 50 to thereby activate or actuate the downhole tool 50 according to information or commands contained in the original signal 110. In other embodiments, however, the action may include retrieving information from the downhole tool 50 and transmitting a new signal (not shown) containing the retrieved information to the hub 102.

The time delay $\Delta T$ for re-broadcasting the signal 110 may be any amount of time following the first time T1. In at least one embodiment, for example, the time delay $\Delta T$ may be practically zero, such as in an immediate re-broadcasting of the pulse train 110. In some embodiments, each receiving trigger 104A,B may be configured to delay the re-broadcast of the pulse train 110 by the same time delay $\Delta T$ such that the signals 112A,B are re-broadcast in unison to the third trigger 104C. In other embodiments, however, the receiving triggers 104A,B may each be configured to re-broadcast the pulse train 110 at slightly offset time delays $\Delta T$ such that the triggers 104A,B transmit a frequency sweep i.e., a chirp. For instance, there may be instances where the system 100 is resonating when the re-broadcasted signals 112A,B are slightly offset. In other words, when the first trigger 104A transmits a frequency that carriers a high amplitude, a short time later the second trigger 104B may be configured to transmit that same frequency also at that high amplitude. On the other hand, when the second trigger 104B is transmitting a high amplitude signal re-broadcast signal 112B, the first trigger 104B may be configured to transmit a frequency having a lower amplitude. As a result, the first and second triggers 104A,B are able to transmit a more stable re-broadcasting of the original pulse train 110 at higher overall average amplitudes.

Each trigger 104A-C may be assigned an identifier that may be stored in each respective trigger 104A-C, and each identifier may be selected from a plurality of known identifiers. In certain embodiments, the identifier of each trigger 104A-C may be a unique identifier. In other embodiments, however, a common identifier may be assigned to two or more of the triggers 104A-C. The signal 110 may include one or more recipient identifiers that are selected from the same plurality of identifiers as the identifiers of the triggers 104A-C. Each of the triggers 104A-C may be configured to decode the received pulse train 110 and determine whether the included recipient identifier matches its corresponding assigned identifier. In certain embodiments, each trigger 104A-C may process the pulse train 110 and, if appropriate, perform an action if the recipient identifier matches the assigned identifier. When the recipient identifier does not match the respective assigned identifier, the triggers 104A-C may be configured to re-broadcast the pulse train 110, as generally described above. In at least one embodiment, each trigger 104A-C may be configured to re-broadcast the pulse train 110 regardless of whether the recipient identifier matches its assigned identifier.

Referring again to FIG. 2A, in another embodiment, a set of triggers 104 (i.e., triggers 104A-C) may be programmed to perform a respective action upon receipt of the pulse train 110. In certain embodiments, the pulse train 110 is a set of pulses, for example fluid pulses, that encode a command signal. For example, the first trigger 104A may be configured to perform its action upon receipt of one pulse train 110, the second trigger 104B may be configured to perform its action upon receipt of two pulse trains 110 within a first amount of time, and the third trigger 104C may be configured to perform its action upon receipt of three pulse trains 110 within a second amount of time that may differ from the first amount of time.

In this example, a single pulse train 110 may be configured to cause first trigger 104A to perform its respective action while the second and third triggers 104B,C remain inactive or otherwise do nothing. Receipt of two pulse trains 110 within the first amount of time from the time of receipt of the first signal 110, however, may be configured to cause the second trigger 104B to perform its respective action while the first trigger 104A (having performed its respective action within the first amount of time) and the third trigger 104C do nothing or otherwise remain inactive. Moreover, receipt of three pulse trains 110 within the second amount of time from the time of receipt of the first pulse train 110 will cause the third trigger 104C to perform its respective action, while the first and second triggers 104A,B (having performed their respective actions within the second amount of time) do nothing or otherwise remain inactive.

It can be seen that this example embodiment does not require the assignment of identifiers to the individual triggers within the pulse train 110 while still allowing the activation of a particular trigger by selection of the number of pulse trains 110 to transmit within a period of less than the second amount of time.

In certain other embodiments, each of the triggers 104A-C may be configured to wait for a third amount of time and count the number of pulse trains 110, or the number of individual pulses in other embodiments, received within that time. Each trigger 104A-C may be configured to perform its respective action only if the total number of pulse trains 110 received within the third amount of time is equal to a number assigned to the respective trigger 104A-C. In an example of such an embodiment, the second trigger 104B may be configured to would perform its respective action if two pulse trains 110 were transmitted within the third amount of time while the first and third triggers 104A,C, being respectively configured to act upon receipt of one or three pulse trains 110, would do nothing as the number of transmitted pulse trains 110 did not match their respective assigned numbers.

Figure 3A:
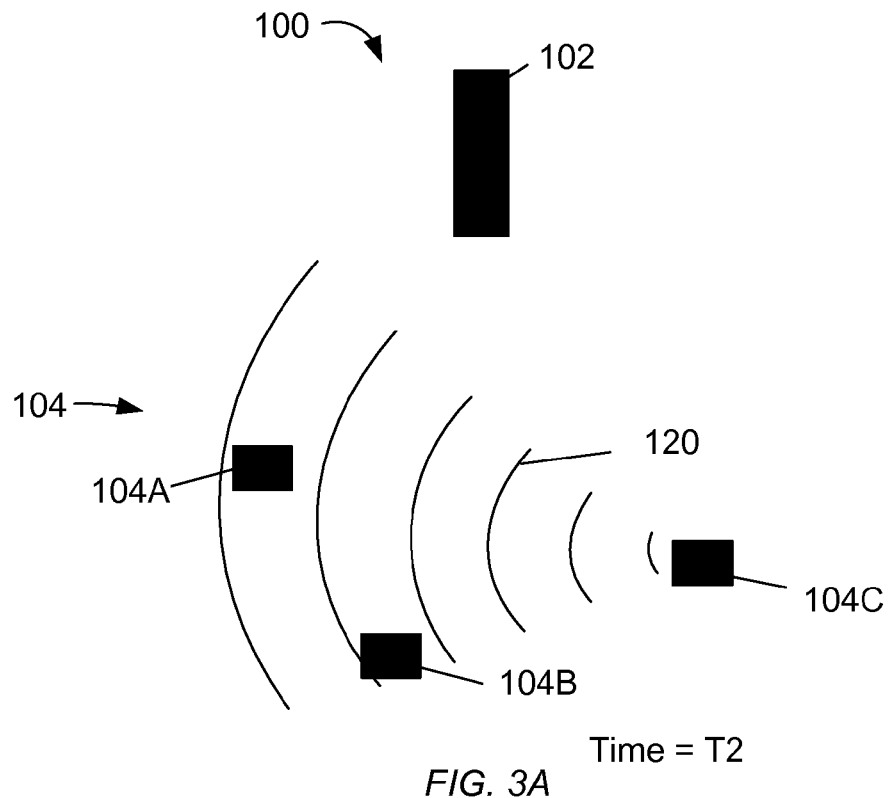
FIGS. 3A-3B depict an enlarged view of the echo telemetry system of FIG. 1 during upward signal transmission, according to certain embodiments of the present disclosure.
Figure 3B:
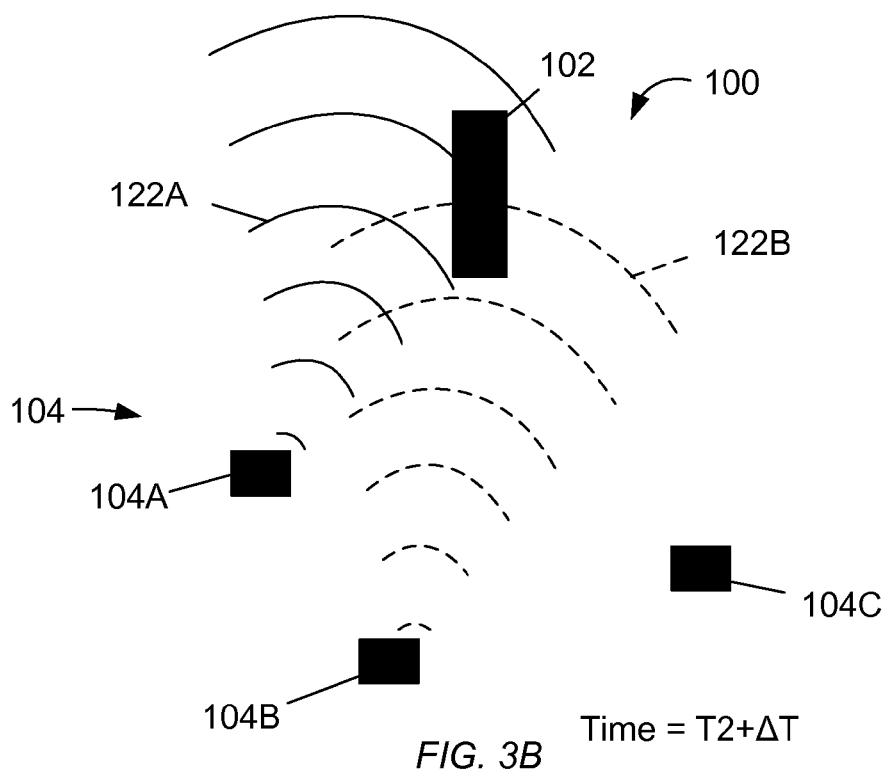

Referring now to FIGS. 3A and 3B, with continued reference to FIG. 1, depicted is an enlarged view of the echo telemetry system 100 as used for upward signal transmission, according to certain embodiments of the present disclosure. In particular, FIGS. 3A-B depict a sequence of steps in re-broadcasting an uplink signal. As with FIGS. 2A-2B, the borehole 20 and tubular 16 as shown in FIG. 1 have been omitted from FIGS. 3A-3B for clarity. In FIG. 3A, the third trigger 104C may be configured to transmit an outbound or uplink signal 120 that is intended for hub 102 at a time T2. In this example, the signal 120 does not propagate upward to the hub 102, but is instead transmitted toward and received by the first and second triggers 104A-B. Such lateral transmission of an uplink signal 120 may be required in applications where, for example, there is an obstruction between the third rigger 104C and hub 102 such that a line-of-sight path between the two components is obscured or a direct transmission path between the two components is otherwise hindered.

In certain embodiments, the upward signal 120 is different from the downward pulse train 110 such that the first and second triggers 104A,B can determine that the upward signal 120 is an uplink signal and take no action themselves in response to receiving the signal 120.

With reference to FIG. 3B, the first and second triggers 104A,B may be configured to re-broadcast the signal 120 (shown as signals 122A and 122B, respectively) at a time that is after time T2 by a time delay $\Delta T$. In the illustrated example, the hub 102 receives both re-broadcasted signals 122A,B, thereby effectively receiving the original upward signal 120 from the third trigger 104C. Similar to the embodiments of FIGS. 2A-B, the time delay $\Delta T$ for re-broadcasting the signal 120 may be any amount of time following the second time T2. In at least one embodiment, for example, the time delay $\Delta T$ may be practically zero, such as in an immediate re-broadcasting of the signal 120. In some embodiments, each receiving trigger 104A,B may be configured to delay the re-broadcast of the signal 120 by the same time delay $\Delta T$ such that the signals 122A,B are re-broadcast in unison to the hub 102. In other embodiments, however, the receiving triggers 104A,B may each be configured to re-broadcast the signal 120 at slightly offset time delays $\Delta T$ such that the triggers 104A,B transmit a frequency sweep (i.e., a chirp).

Figure 4:
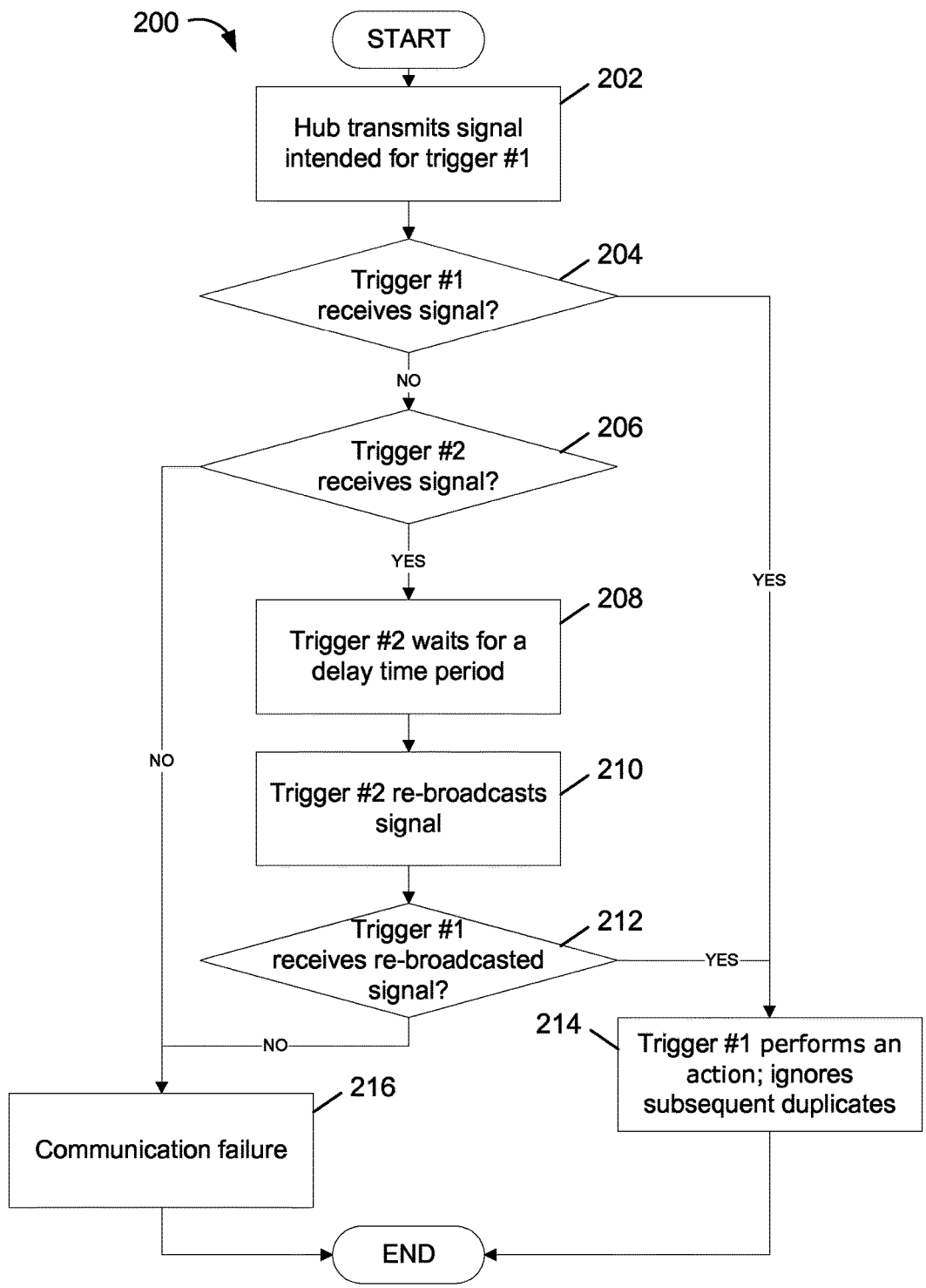
FIG. 4 is a flowchart of a method of downhole communication, according to certain embodiments of the present disclosure.

Referring now to FIG. 4, with continued reference to FIGS. 2A and 2B, illustrated is a flowchart of an example method 200 of downhole communication, according to certain embodiments of the present disclosure. The method may include transmitting a signal, for example a pulse train 110, with the hub 102 that is intended for trigger #1 (e.g., the third trigger 104C), as at 202. At decision block 204, the method 200 may follow the 'yes' path if trigger #1 received the pulse train 110 and may include trigger #1 performing an action in accordance with the pulse train 110, as at 214. In certain embodiments, trigger #1 may be configured to ignore subsequent duplicate pulse trains, and may do so, for example, for a predetermined amount of time. Along this branch of the method 200, it does not matter what actions are taken by trigger #2 (e.g., one or both of triggers 104A and 104B) since the intended action by trigger #1 has been accomplished.

On the other hand, if trigger #1 does not receive the pulse train 110, the method 200 branches at decision block 204 to the 'no' path to decision block 206. If trigger #2 (e.g., one or both of triggers 104A and 104B) does not receive the pulse train 110, the pulse train 110 is lost and the method 200 branches along the 'no' path and it is determined that there was a communication failure, as at 216. In such as case, none of the triggers 104A-C are able to receive a signal from the hub 102 and other actions, such as repositioning one or more of the hub 102 and the triggers 104A-C, must be taken to establish a proper communication link between the hub 102 and the triggers 104A-C.

If trigger #2 receives the pulse train 110, the method 200 branches along the 'yes' path and may include waiting for a delay time period with trigger #2, as at 208. In certain embodiments, the delay time period may be zero or a time interval greater than zero. When the delay time period has elapsed, the method 200 may include re-broadcasting the pulse train 110 with trigger #2, as at 210. If the re-broadcasted pulse train 110 (i.e., signals 112A,B in FIG. 2B) is received by trigger #1, the method 200 branches at decision block 212 to block 214 and performs the actions associated therewith, as generally described above. If trigger #1 does not receive the re-broadcasted pulse train 110, then it is determined that there was a communication failure, as at 216, and the method 200 terminates.

As illustrated in FIG. 4, and with reference to FIG. 2A, communication failure, as at 216, requires two failures for the communication link between the hub 102 and trigger #1. Either trigger #1 (e.g., the third trigger 104C) must fail to receive the original pulse train 110 and the re-broadcast signal 112, or both trigger #1 and trigger #2 (e.g., triggers 104A-C) must fail to receive the original pulse train 110. As can be appreciated, this provides redundancy in communication links related to the spatially dependent signal strengths and may avoid the effect of a trigger being located in a "dead zone" of signals broadcast by a hub.

Figure 5:
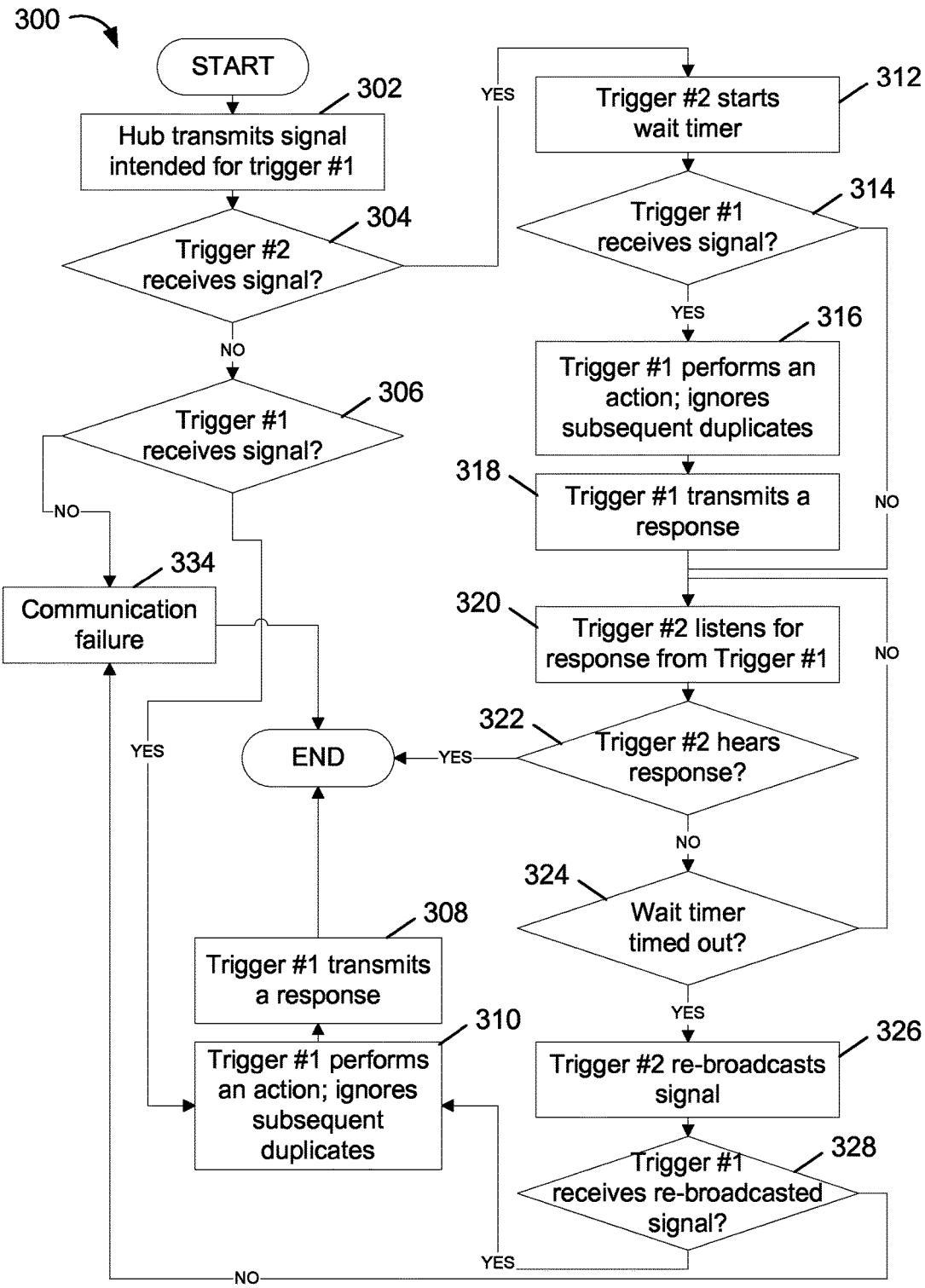
FIG. 5 is a flowchart of another method of downhole communication, according to certain embodiments of the present disclosure.

FIG. 5 is a flowchart of another method 300 of downhole communication, according to certain embodiments of the present disclosure. In this embodiment, and with reference to FIGS. 2A and 2B, the hub 102 transmits a signal, for example a pulse train 110, that is intended for trigger #1, e.g., trigger 104C. If trigger #2 receives the pulse train 110, the method 300 branches at decision block 304 along the 'yes' path to block 312 wherein trigger #2 starts a "wait" timer and the method 300 proceeds to block 314. If trigger #1 also receives pulse train 110, the method 300 branches at decision block 314 along the 'yes' path to block 316 wherein trigger #1 performs an action in accordance with the pulse train 110. In certain embodiments, trigger #1 ignores subsequent duplicate signals. In certain embodiments, trigger #1 ignores subsequent duplicate signals for a determined amount of time. After performing the action in block 316, the method 300 moves to block 318 wherein trigger #1 transmits a response signal, e.g., an "ack" signal, signifying that trigger #1 has received or otherwise acknowledged the pulse train 110. The method 300 may then include listening for a response from trigger #1 with trigger #2, as at 310. The method 300 then moves to decision block 322 wherein, since trigger #1 transmitted the response in the prior block 318, the method 300 branches along the 'yes' path and terminates. Any other actions by any device are irrelevant as the intended recipient has executed the intended action.

If trigger #1 does not receive the pulse train 110 in decision block 314, the method 300 branches along the 'no' path to block 320 where the method 300 starts listening for a response from trigger #1 in a loop from block 320 to decision block 322 and along the 'no' path to decision block 324 where the state of the "wait" time started in block 312 is checked and, if the "wait" timer has not timed out, the method 300 returns to block 320 along the 'no' path. If the method 300 arrives directly here from decision block 314, there will be no response and the method 300 will continue within this loop until the "wait" timer times out, whereupon the method 300 will branch at block 324 along the 'yes' path to block 326 wherein trigger #2 re-broadcasts the pulse train 110 as a signal 112. If trigger #1 receives signal 112, the method 300 branches at decision block 328 along the 'yes' path to block 310, a duplicate of block 316, wherein trigger #1 performs an action in accordance with pulse train 110, transmits a response in block 308, a duplicate of block 318, and then the method 300 terminates. If trigger #1 does not receive signal 112 in block 328, this is a two-failure situation and method 300 branches along the 'no' path to communication failure in block 334 and then method 300 terminates.

Referring back to decision block 304, if trigger #2 does not receive pulse train 110, the method 300 branches along the 'no' path to decision block 306. If trigger #1 also has failed to receive pulse train 110, this is again a two-failure situation and method 300 branches along the 'no' path to communication failure in block 334 and terminates. If trigger #1 receives the signal in block 306, the method 300 branches along the 'yes' path to block 310 where trigger #1 performs an action, transmits a response in block 308, and the method 300 terminates.

It can be seen that method 300 requires two communication link failures for the entire communication between the hub 102 and trigger #1 (e.g., the third trigger 104C) to fail. Compared to method 200, the method 300 reduces the number of unnecessary signals being transmitted within a borehole 20 by cancelling the re-broadcast of a signal by triggers that both receive the initial signal and receive a response from the intended recipient trigger.

Figure 6:
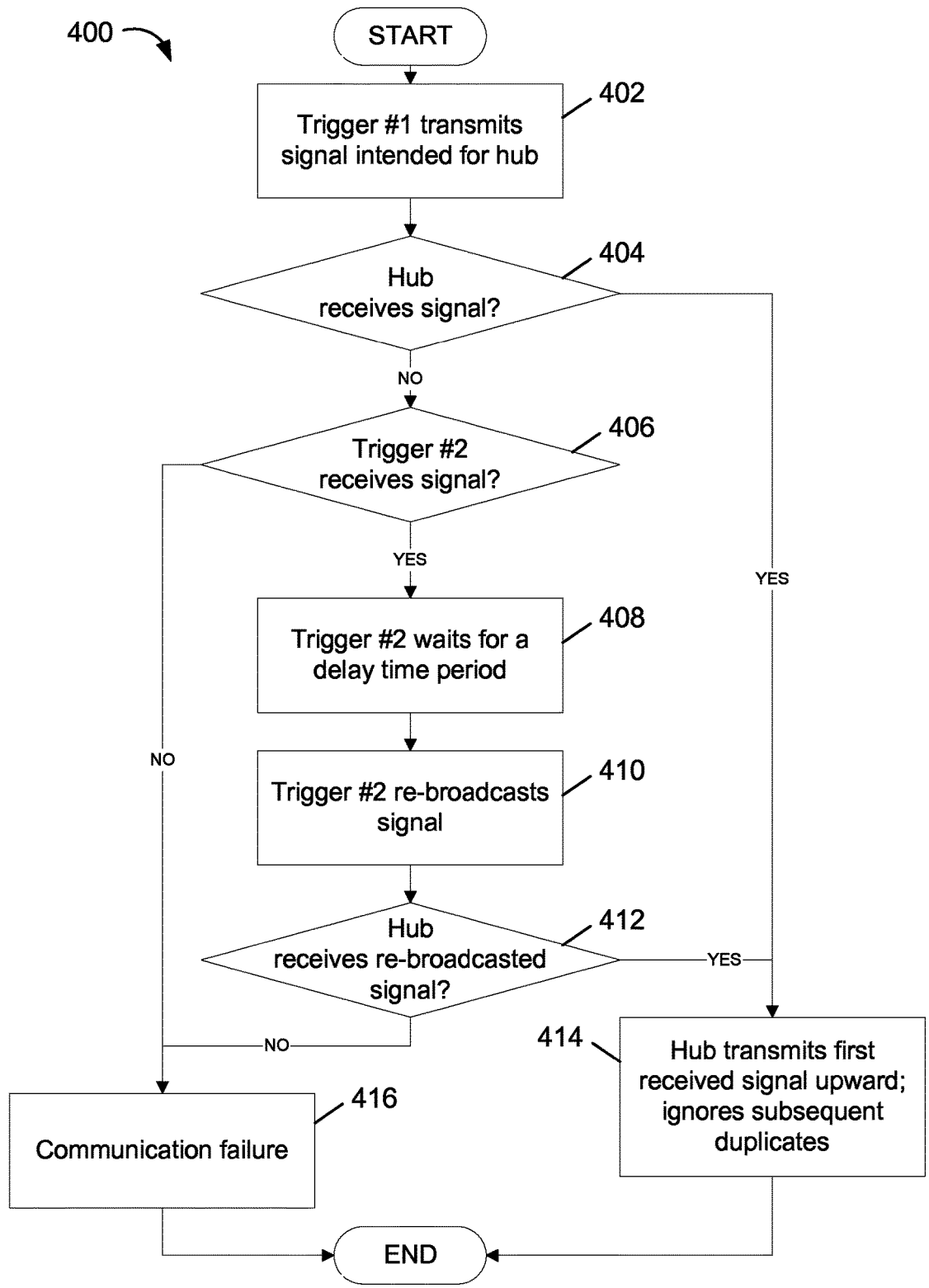
FIG. 6 is a flowchart of a method of upward communication, according to certain embodiments of the present disclosure.

Referring now to FIG. 6, with continued reference to FIGS. 3A-B, illustrated is a flowchart of an example method 400 of upward communication, according to certain embodiments of the present disclosure. The method 400 starts with block 402 wherein trigger #1 transmits a signal 120 intended for the hub 102. If the hub 102 receives the signal 120, the method 400 branches at decision block 404 along the 'yes' path to block 414 wherein the hub 102 retransmits a copy of the signal 120 upward. In certain embodiments, the hub 102 ignores subsequent duplicate signals. In certain embodiments, the hub 102 ignores subsequent duplicate signals for a determined amount of time.

If, at decision block 404, the hub 102 did not receive the signal 120, the method 400 branches along the 'no' path to decision block 406 where, if trigger #2 does not detect the signal 120, the system has experienced two failures of communication links and the method 400 branches along the 'no' path to communication failure in block 416 and the method 400 terminates.

If trigger #2 does receive the signal 120, the method 400 branches at block 406 along the 'yes' path to block 408 wherein trigger #2 waits for a delay time period. In certain embodiments, the delay time period may be zero or a non-zero amount of time. After the delay time period has passed, trigger #2 re-broadcasts the signal 120 as a re-broadcasted signal 122 in block 410. If the hub 102 receives the signal 122, the method 400 branches at decision block 412 along the 'yes' path to block 414, described above, and then the method 400 terminates.

If the hub 102 does not receive the re-broadcasted signal 122 as determined in decision block 412, the system has again experienced two failures of communication links and the method 400 branches along the 'no' path to communication failure in block 416 and the method 400 terminates.

It can be seen that the method 400 provides the same benefits for upward communication as does method 200 of FIG. 4 for downward communication. It should be noted that the descriptions of "upward" and "downward" are arbitrary and used herein for consistency with other disclosed embodiments, and the directional adjectives may be reversed, e.g., the method 400 could describe a plurality of triggers transmitting downward within a borehole to a single hub, without departing from the scope of this disclosure.

Figure 7A:
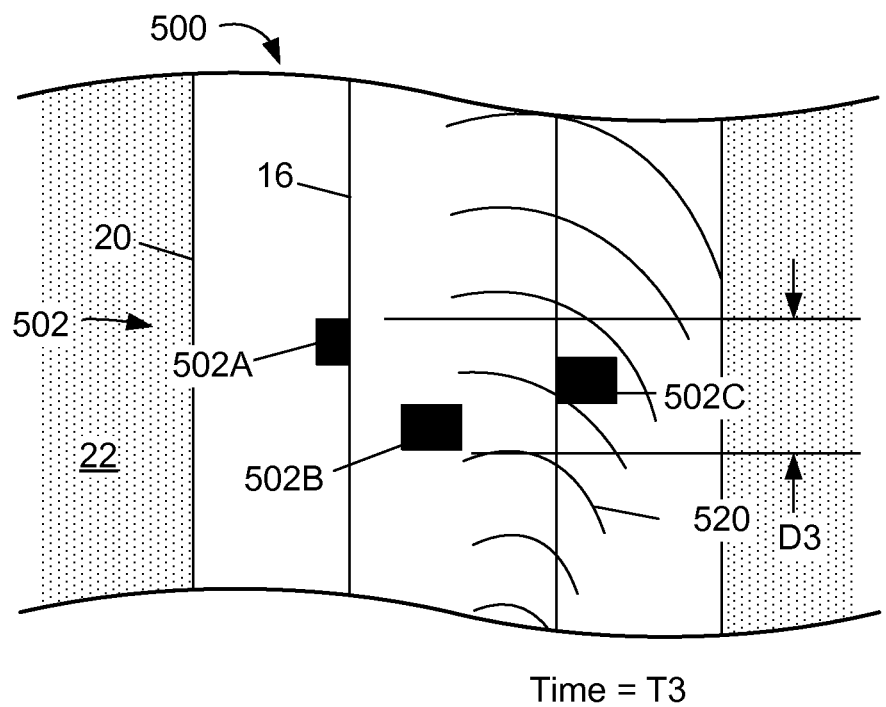
FIGS. 7A-7C depict an exemplary system for relaying transmission signals within a borehole, according to certain embodiments of the present disclosure.
Figure 7B:
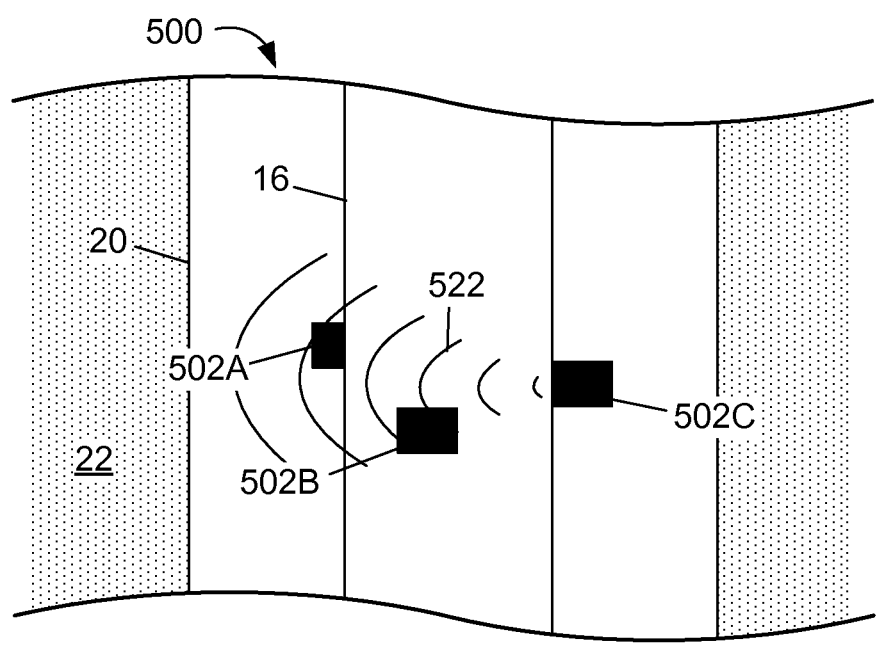
Figure 7C:
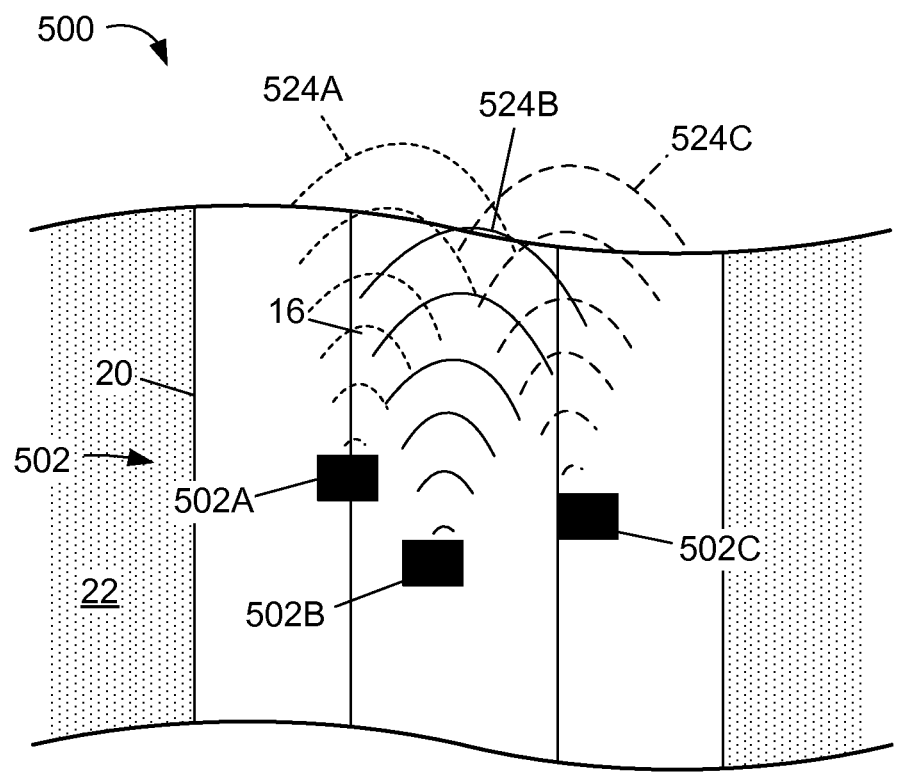

FIGS. 7A-7C depict an exemplary echo telemetry system 500 for relaying wireless transmissions within a borehole, according to certain embodiments of the present disclosure. In this example, a plurality of triggers, referred to here as "linked repeaters" 502, are disposed at a point along a borehole 20 and coupled to or otherwise arranged about a drill string 16 extended within the borehole 20. In certain embodiments, the linked repeaters 502 may be attached to the drill string 16 or to the sides of the borehole 20. In some embodiments, the linked repeaters 502 (shown as first, second, and third linked repeaters 502A, 502B, and 502C, respectively) may be generally located within the borehole 20 within an axial zone encompassing a third distance D3. The third distance D3 may be less than a distance between the linked repeaters 502 and a separate set of linked repeaters (not shown) that are axially offset from the first set of linked repeaters 502 within the borehole 20.

At a time T3, a signal 520 may be received from a first direction within the borehole 20. In one embodiment, the signal 520 may be an uplink signal, as illustrated. In other embodiments, however, the signal 520 may be a downlink signal, without departing from the scope of the disclosure. In the illustrated example, the signal 520 may be received by the third linked repeater 502C, whereas the first and second repeaters 502A,B may not receive the signal 520.

With reference to FIG. 7B, at a time interval ΔT after time T3, the third repeater 502C may be configured to re-broadcast the signal 520 (shown as re-broadcast signal 522) to the first and second repeaters 502A,B. Due to the proximity and shorter transmission distance of the third repeater 502C, the first and second repeaters 502A,B are able to receive the re-broadcast signal 522 from linked repeater 502C. The time delay ΔT for re-broadcasting the signal 520 may be any amount of time following the third time T3. In at least one embodiment, for example, the time delay ΔT may be practically zero, such as in an immediate re-broadcasting of the signal 520.

Referring to FIG. 3C, after an additional time delay ΔS, all of the linked repeaters 502A, 502B, and 502C that either received the original signal 520 or the re-broadcast signal 522 may be configured to re-transmit the signal 520 within the borehole 20 as signals 524A, 524B, and 524C, respectively. The time delay ΔS for re-broadcasting the signal 522 may be any amount of time following the receipt of the signal 522. In at least one embodiment, for example, the time delay ΔS may be practically zero, such as in an immediate re-broadcasting of the signal 522. In certain embodiments, the re-transmitted signals 524A-C may be transmitted simultaneously, i.e., in unison. In other embodiments, however, the signals 524A-C may be transmitted at slightly offset times in order to transmit a frequency sweep (i.e., a chirp).

Figure 8:
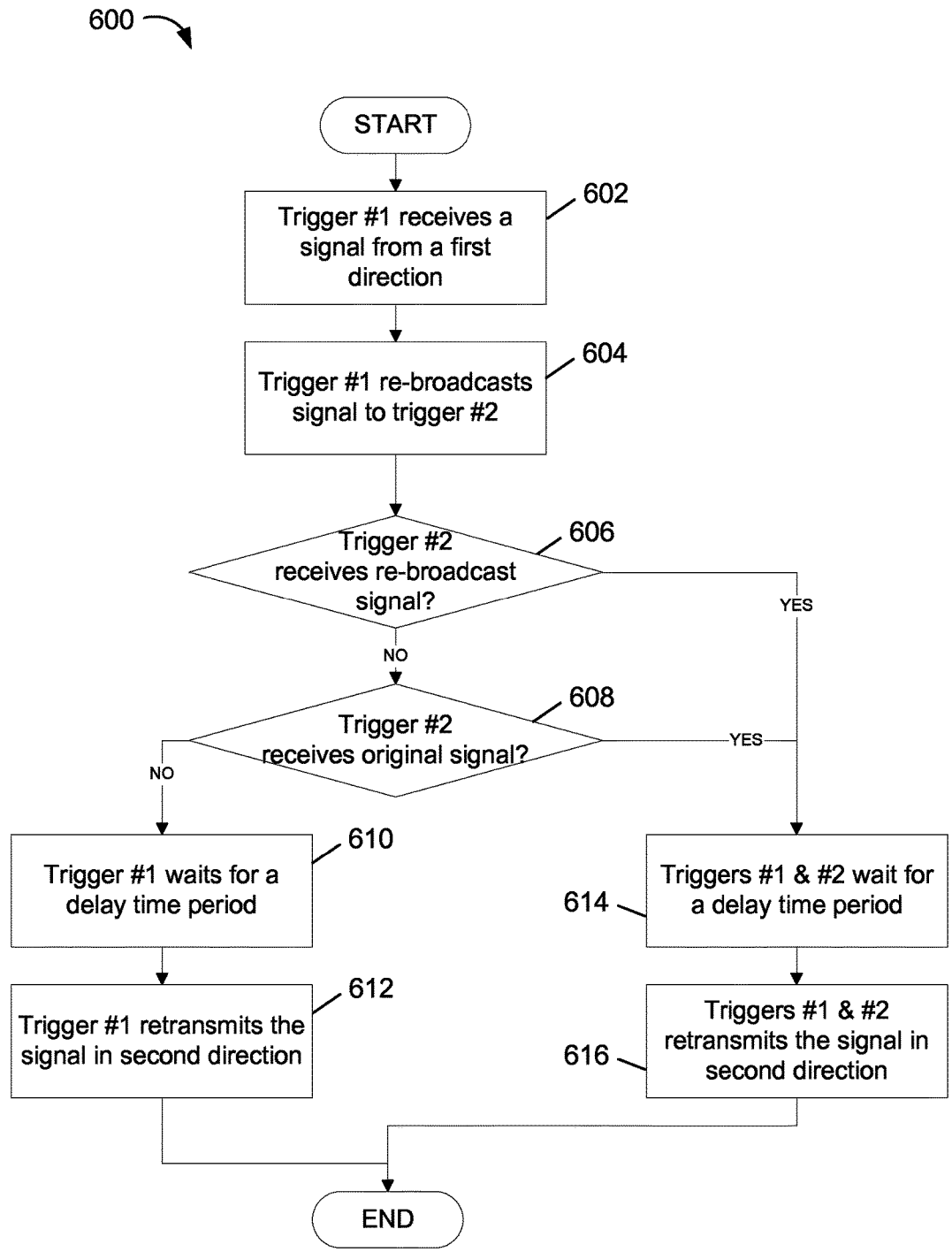
FIG. 8 is a flowchart of a method of relaying transmission signals within a borehole, according to certain embodiments of the present disclosure.

FIG. 8 is a flowchart of an example method 600 of relaying transmissions within a borehole, according to certain embodiments of the present disclosure. The method 600, with reference to the system of FIGS. 7A-7C, starts with trigger #1 (e.g., the third linked repeater 502C) receiving a signal 520 from a first direction, e.g., from downhole, as at 602. Trigger #1 may then be configured to re-broadcast a copy of the signal 520 as signal 522, as at 604.

If, according to decision block 606, trigger #2 receives the re-broadcast signal 522 or receives the original signal 520, as in decision block 608, the method 600 branches along the respective 'yes' path to an optional block 614 wherein both triggers #1 and #2 wait for a delay time period and then in block 616 retransmit a copy of signal 520 as signals 524A and 524B, respectively, in a second direction, e.g., upward within the borehole. The method 600 then terminates.

If trigger #2 fails to receive the re-broadcast signal 522 in block 606 and also failed to receive the original signal 520 in block 608, the method 600 branches at decision block 608 along the 'no' path to optional block 610 where trigger #1 waits for a delay time period and then transmits a copy of the original signal 520 as a signal 524 in the second direction, as previously described for block 616.

In certain embodiments, the linked repeaters 502 do not re-broadcast the signals 522 but, instead, the linked repeaters 502 that do receive the original signal 520 simply re-transmit a copy of the signal 520 as a signal 524. In certain embodiments, each of the linked repeaters waits for a common delay time that may be zero or a non-zero time and then the linked repeaters re-transmit the signals 524 simultaneously, i.e., in unison. In certain embodiments, the linked repeaters 502 wait for different amount of delay time and then re-transmit the signals 524 at slightly offset times, i.e., in discord.

Therefore, the systems and methods described herein are well adapted to attain the ends and advantages mentioned as well as those that are inherent therein. The particular embodiments disclosed above are illustrative only, as the disclosed systems and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A system, comprising:
 a plurality of triggers disposed in a borehole and within a first distance of each other, the plurality of triggers comprising at least one recipient trigger; and a hub disposed in the same borehole as the plurality of triggers and separated from the plurality of triggers by at least a second distance that is greater than the first distance, wherein the hub includes a directional transceiver that wirelessly transmits a signal directly to each trigger of the plurality of triggers other than the at least one recipient trigger, and the signal is intended for the at least one recipient trigger, and wherein each trigger other than the at least one recipient trigger directly receives the signal from the hub and re-broadcasts the signal to the at least one recipient trigger.

2. The system of claim 1, wherein:
each trigger other than the at least one recipient trigger is configured to receive and re-broadcast the signal if the respective trigger is not the at least one recipient trigger.

3. The system of claim 1, wherein:
the signal transmitted by the hub comprises a recipient identifier selected from a plurality of identifiers; and
each trigger of the plurality of triggers is associated with a respective one of the plurality of identifiers.

4. The system of claim 3, wherein each trigger processes the signal and re-broadcasts the signal if the recipient identifier is different from the identifier associated with the respective trigger.

5. The system of claim 3, wherein each trigger is communicably coupled to a downhole tool and, upon processing the signal, each trigger activates its corresponding downhole tool to perform an action if the recipient identifier is the same as the identifier associated with the respective trigger.

6. The system of claim 5, wherein the downhole tool is a mechanism comprising at least one of a fluid sampling system or device, a telemetry tool, a packer or other wellbore isolation device, a motor, an inflow control device, a sliding sleeve, an electronic rupture disc, a jarring tool, a subsea tree, a safety valve, a sensor and a retainer valve.

7. The system of claim 3, wherein the triggers that are associated with identifiers that do not match the recipient identifier re-broadcast the signal simultaneously.

8. The system of claim 3, wherein the triggers that are associated with identifiers that do not match the recipient identifier rebroadcast the signal at times that are offset from each other.

9. The system of claim 1, wherein the plurality of triggers are arranged about a tubular extended within the borehole.

10. A method, comprising:
transmitting a wireless signal to a plurality of triggers disposed within a borehole with a hub disposed within the same borehole,
wherein the hub includes a directional transceiver, the plurality of triggers include at least one recipient trigger, the wireless signal is transmitted directly to each trigger of the plurality of triggers other than the at least one recipient trigger and is intended for the at least one recipient trigger, and the plurality of triggers are arranged within a first distance of each other and the hub is separated from the plurality of triggers by at least a second distance that is greater than the first distance; and
receiving the wireless signal directly with each trigger other than the at least one recipient trigger and re-broadcasting the wireless signal with each trigger other than the at least one recipient trigger to the at least one recipient trigger.

11. The method of claim 10, wherein the wireless signal transmitted by the hub comprises a recipient identifier selected from a plurality of identifiers, and each trigger is associated with a respective one of the plurality of identifiers, wherein re-broadcasting the wireless signal comprises processing the wireless signal if the recipient identifier matches the identifier associated with the respective trigger and otherwise re-broadcasting the wireless signal.

12. The method of claim 11, wherein re-broadcasting the wireless signal comprises re-broadcasting the wireless signal simultaneously with triggers that are associated with identifiers that do not match the recipient identifier.

13. The method of claim 11, wherein re-broadcasting the wireless signal comprises re-broadcasting the wireless signal with triggers that are associated with identifiers that do not match the recipient identifier at times that are offset from each other.

14. The method of claim 11, wherein processing the wireless signal comprises:
activating a downhole tool communicably coupled to each trigger whose identifier matches the recipient identifier; and
performing an action with the downhole tool upon being activated by its respective trigger.

15. The method of claim 14, further comprising:
creating a telemetry signal with the trigger communicably coupled to the downhole tool, the telemetry signal comprising information received from the downhole tool;
transmitting the telemetry signal to adjacent triggers of the plurality of triggers; and
transmitting the telemetry signal to the hub with the adjacent triggers.

16. The method of claim 15, wherein transmitting the telemetry signal to the hub comprises transmitting the telemetry signal simultaneously with the adjacent triggers.

17. The method of claim 15, wherein transmitting the telemetry signal to the hub comprises transmitting the telemetry signal at times that are offset from each other with the adjacent triggers.

18. A system, comprising:
a plurality of triggers disposed in a borehole and within a first distance of each other; and
a hub disposed in the same borehole as the plurality of triggers and separated from the plurality of triggers by at least a second distance that is greater than the first distance,
wherein the hub includes a directional transceiver that directly receives a wireless signal transmitted by any of the plurality of triggers, and
wherein at least one trigger of the plurality of triggers transmits the wireless signal intended for the hub directly to each of the other triggers of the plurality of triggers and each of the other triggers receives and re-broadcasts the received wireless signal directly to the hub.

19. The system of claim 18, wherein the triggers that re-broadcast the signal do so simultaneously.

20. The system of claim 18, wherein the triggers that re-broadcast the signal do so at times that are offset from each other.

* * * * *